United States Patent
Oehler et al.

(10) Patent No.: US 12,172,616 B2
(45) Date of Patent: Dec. 24, 2024

(54) ELECTROMECHANICAL BRAKE PRESSURE GENERATOR FOR A HYDRAULIC BRAKE SYSTEM OF A VEHICLE

(71) Applicant: Robert Bosch GmbH, Stuttgart (DE)

(72) Inventors: Claus Oehler, Karlsruhe (DE); Mark Boehm, Lehrensteinsfeld (DE); Martin Uhlig, Ilsfeld (DE); Christoph Oehler, Karlsruhe (DE); Marc Micke, Boennigheim (DE); Konstantin Haberkorn, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 308 days.

(21) Appl. No.: 17/429,921

(22) PCT Filed: Feb. 8, 2020

(86) PCT No.: PCT/EP2020/053225
§ 371 (c)(1),
(2) Date: Aug. 10, 2021

(87) PCT Pub. No.: WO2020/216484
PCT Pub. Date: Oct. 29, 2020

(65) Prior Publication Data
US 2022/0126807 A1 Apr. 28, 2022

(30) Foreign Application Priority Data
Apr. 25, 2019 (DE) .......................... 102019205978.3

(51) Int. Cl.
*B60T 13/74* (2006.01)
*F04B 17/03* (2006.01)

(52) U.S. Cl.
CPC ............ *B60T 13/745* (2013.01); *F04B 17/03* (2013.01)

(58) Field of Classification Search
CPC ...... F04B 17/03; B60T 13/745; B60T 13/741; B60T 8/4018; F16D 2125/50; F16D 2125/40; F16D 2121/24
See application file for complete search history.

(56) References Cited

U.S. PATENT DOCUMENTS 4,804,073 A * 2/1989 Taig ........................ F16D 65/18
475/342
2008/0283345 A1 11/2008 Balz et al.
(Continued)

FOREIGN PATENT DOCUMENTS

CN 108105292 A 6/2018
CN 108105295 A 6/2018
(Continued)

OTHER PUBLICATIONS

English translation of DE 10 2011 007 025 (Gosse) (Year: 2012).*
International Search Report for PCT/EP2020/053225, Issued Sep. 29, 2020.

*Primary Examiner* — Randell J Krug
(74) *Attorney, Agent, or Firm* — NORTON ROSE FULBRIGHT US LLP; Gerard A. Messina

(57) ABSTRACT

An electromechanical brake pressure generator for a hydraulic braking system of a vehicle. The brake pressure generator has a spindle drive unit for converting an input-drive-side rotational motion into a translational motion for piston actuation of a hydraulic piston/cylinder unit. A multi-stage gear linkage is disposed between the spindle drive unit and an electric drive motor. The gear linkage encompasses a planetary gearset unit driven by a motor pinion constituting a sun gear, the output-drive-side ring gear of which unit drives the spindle drive unit. A motor shaft of the electric drive motor extends in adjacently parallel fashion next to a spindle drive shaft of the spindle drive unit.

10 Claims, 2 Drawing Sheets

(56) References Cited

U.S. PATENT DOCUMENTS

2009/0308698 A1* 12/2009 Park .................... B60T 13/741
                                                        188/17
2017/0030445 A1*  2/2017 Weh ..................... F15B 15/14
2018/0354481 A1* 12/2018 Hofschulte ............ B60T 11/04

FOREIGN PATENT DOCUMENTS

| | | | | |
|---|---|---|---|---|
| CN | 108167434 A | 6/2018 | | |
| CN | 108189826 A | 6/2018 | | |
| CN | 108394393 A | 8/2018 | | |
| CN | 207943034 U | 10/2018 | | |
| DE | 102011007025 A1 | * 10/2012 | ............. | B60T 8/326 |
| JP | 2007160992 A | 6/2007 | | |
| JP | 2012530645 A | 12/2012 | | |
| JP | 2015160607 A | 9/2015 | | |
| JP | 2017137928 A | 8/2017 | | |
| JP | 2018526266 A | 9/2018 | | |
| WO | 2017045804 A1 | 3/2017 | | |

* cited by examiner

ELECTROMECHANICAL BRAKE PRESSURE GENERATOR FOR A HYDRAULIC BRAKE SYSTEM OF A VEHICLE

The present invention relates to an electromechanical brake pressure generator for a hydraulic braking system of a vehicle, having a spindle drive unit for converting an input-drive-side rotational motion into a translational motion for piston actuation of a hydraulic piston/cylinder unit, a multi-stage gear linkage being disposed between the spindle drive unit and an electric drive motor. The present invention furthermore also relates to a vehicle, in particular a hybrid or electric vehicle, containing this electromechanical brake pressure generator.

BACKGROUND INFORMATION

Alternative brake pressure buildup devices are necessary for future motor-vehicle drive concepts, since negative pressure for operating a conventional vacuum brake booster is no longer available. The electromechanical brake pressure generators of interest here were developed for that purpose.

In an electromechanical brake pressure generator of the kind of interest here, the braking force at the piston/cylinder unit is generated by way of an electric motor or another suitable electrical drive system. Such brake pressure generators can be used not only to furnish a power assist but also, in so-called "brake by wire" systems, for exclusive generation of the brake actuation force. Electromechanical brake pressure generators are therefore advantageous in particular with regard to autonomous driving.

In accordance with the related art regarding such electromechanical braking force generators, upon actuation of the brake pedal, the manually executed pedal travel is measured by way of an electronic pedal travel transducer and is forwarded to an electronic control device. The electronic control device calculates therefrom corresponding control application signals for an electrical drive motor. The motor torque is converted via a multi-stage gear linkage into an assistance force for the driver. The force supplied by this booster is converted, in a hydraulic piston/cylinder unit, into hydraulic pressure for braking. The electromechanical brake pressure generator supplies a braking feel that is comparable to conventional vacuum brake boosters. The braking feel can thus be adapted by way of the electronic control unit, using software, to brand-specific characteristics of a vehicle.

PCT Patent Application No. WO 2017/045804 A1 describes an electromechanical brake pressure generator. The brake pressure generator encompasses an electric drive motor that is operatively connected via a multi-stage spur gear linkage to a spindle drive unit in such a way that a rotation of the electric drive motor produces a translational motion of a spindle of the spindle drive unit for actuation of a brake master cylinder. The multi-stage spur gear linkage generates, however, quite a large spacing in a radial direction with respect to the spindle drive unit, with a relative low conversion ratio, so that the entire subassembly of this electromechanical braking force generator becomes physically quite large.

An object of the present invention is to provide an electromechanical brake pressure generator with a high and space-saving conversion of the electric-motor drive output for transfer to the spindle drive unit.

SUMMARY

The object may achieved with an electromechanical brake pressure generator in accordance with an example embodiment of the present invention. Advantageous refinements and example embodiments of the present invention are disclosed herein. A vehicle having a hydraulic braking system encompassing the electromechanical brake pressure generator according to the present invention is also provided.

In accordance with an example embodiment of the present invention, the gear linkage of an electromechanical braking force generator encompasses a planetary gearset unit driven by a motor pinion constituting a sun gear, the output-drive-side ring gear of which unit drives the spindle drive unit in such a way that a motor shaft of the electric drive motor extends in adjacently parallel fashion next to a spindle drive shaft of the spindle drive unit.

An advantage of the approach according to an example embodiment of the present invention is in particular that it makes possible a biaxial disposition of the drive motor and spindle drive unit, which makes possible, with incorporation of the high conversion ratio achievable utilizing the planetary gearset unit, a compact configuration. This is because the high conversion ratio achievable by way of the planetary gearset unit having an output-drive-side ring gear also makes possible a decrease, as compared with conventional configurations, in the piston diameter of the hydraulic piston/cylinder unit. The drive forces acting on the components of the electromechanical braking force generator as a result of power transfer are furthermore thereby reduced, so that other components can also be dimensioned to be smaller.

In the electromechanical brake pressure generator according to an example embodiment of the present invention, with the biaxial disposition the spindle drive shaft extends not only parallel to the motor shaft of the electric drive motor but also adjacently thereto in a radial direction, thus also creating greater compactness for the unit in an axial direction.

The gear linkage features according to an example embodiment of the present invention creates the precondition for the electromechanical brake pressure generator to be implementable preferably in a configuration in which the gear linkage is disposed on a first end face, serving as a mechanical connection side, of the drive motor and spindle drive unit.

This in turn creates the precondition for the second end face, located oppositely from this first end face, of the drive motor and of the spindle drive unit disposed in adjacently parallel fashion thereto, to be used as a preferably electrical connection side. This results in the advantage of a clear separation between mechanical and electrical connection of the components of the electromechanical braking force generator, which ensures good accessibility for assembly or repair.

In accordance with a preferred example embodiment of the present invention, an electronic control unit having electrical terminals for a sensor detecting the motor rotation speed in the region of the motor shaft, and for the drive motor, is disposed on the electrical connection side. All the electrical and electronic components of the electromechanical braking force generator can thus be disposed in a physically compactly grouped fashion so that, for example, the sensor for detecting the motor rotation speed can also be disposed directly on the motor shaft and in the region of the electronic control unit, so that conventional complex sensor concepts having rotor position sensors (RPS) and a pole wheel can be omitted.

In accordance with a feature that further improves the multi-stage gear linkage according to an example embodiment of the present invention, it is provided that the latter encompass an intermediate stepped gear whose larger gear meshes with the externally toothed ring gear of the planetary gearset unit, and whose pinion meshes with a spindle gear of the spindle drive unit. On the one hand, the intermediate stepped gear results in a further increase in the conversion ratio for converting the drive rotation speed to be slower, and on the other hand design-imposed radial spacings between the electric drive motor and the adjacent spindle drive unit can be spanned.

The electric drive motor of the electromechanical braking force generator is preferably accommodated in a cup-shaped motor housing. As a result, the motor housing can provide not only the protective function for the electric drive motor but also a supporting function for adjoining components of the gear linkage. In accordance with a preferred embodiment, provision is thus made that the ring gear of the planetary gearset unit is mounted in rolling bearings on the bottom region of the motor housing. In this configuration a rolling bearing, for example a ball bearing, attached on the one hand to the motor housing and on the other hand to the ring gear, coaxially surrounds the motor shaft and makes possible a smooth rotational motion of the output-drive-side ring gear of the planetary gearset unit.

In accordance with a preferred example embodiment of the planetary gearset unit of the present invention, it is further provided that a planet carrier attached to a bottom region of the motor housing is provided, which carrier provides positioning of the planet gears relative to the central sun wheel and to the ring gear. In order to optimize tooth engagement, the planet carrier can also be mounted floatingly with respect to the motor housing.

Preferably, the motor housing surrounding the electrical drive motor comes into abutment on the open side with the edge region against a device housing that is of cuboidal basic geometry. The device housing at least partly accommodates the spindle drive unit as well as the input rod acted upon by a brake pedal. The gear linkage is covered by a cover part which engages over the motor housing and which also comes into abutment against the device housing. The overall result of this is a multi-part housing structure thanks to which the mechanical connection side in particular is readily accessible.

In accordance with a preferred example embodiment of the spindle drive unit of the present invention, the latter is made up substantially of a spindle nut and a spindle in threaded engagement therewith. The spindle drive unit is preferably implemented by way of a component combination that is in direct gear engagement, but can also be embodied as a ball screw drive. The spindle nut is preferably drivable via the spindle gear, fastened coaxially to it, of the gear linkage, which gear is disposed at the end of the spindle drive unit. As a result, the rotational motion of the spindle nut on the output-drive side of the gear linkage produces, under the influence of a conventional torque brace, a translational motion of the spindle which actuates the hydraulic piston/cylinder unit in motor-assisted fashion. Alternatively thereto, a spindle drive unit can also be installed and operated in a kinematically reversed manner.

BRIEF DESCRIPTION OF THE DRAWINGS

Further features that improve the present invention will be depicted below in further detail, together with the description of a preferred exemplifying embodiment of the present invention with reference to Figures.

DETAILED DESCRIPTION OF EXAMPLE EMBODIMENTS

Figure 1:
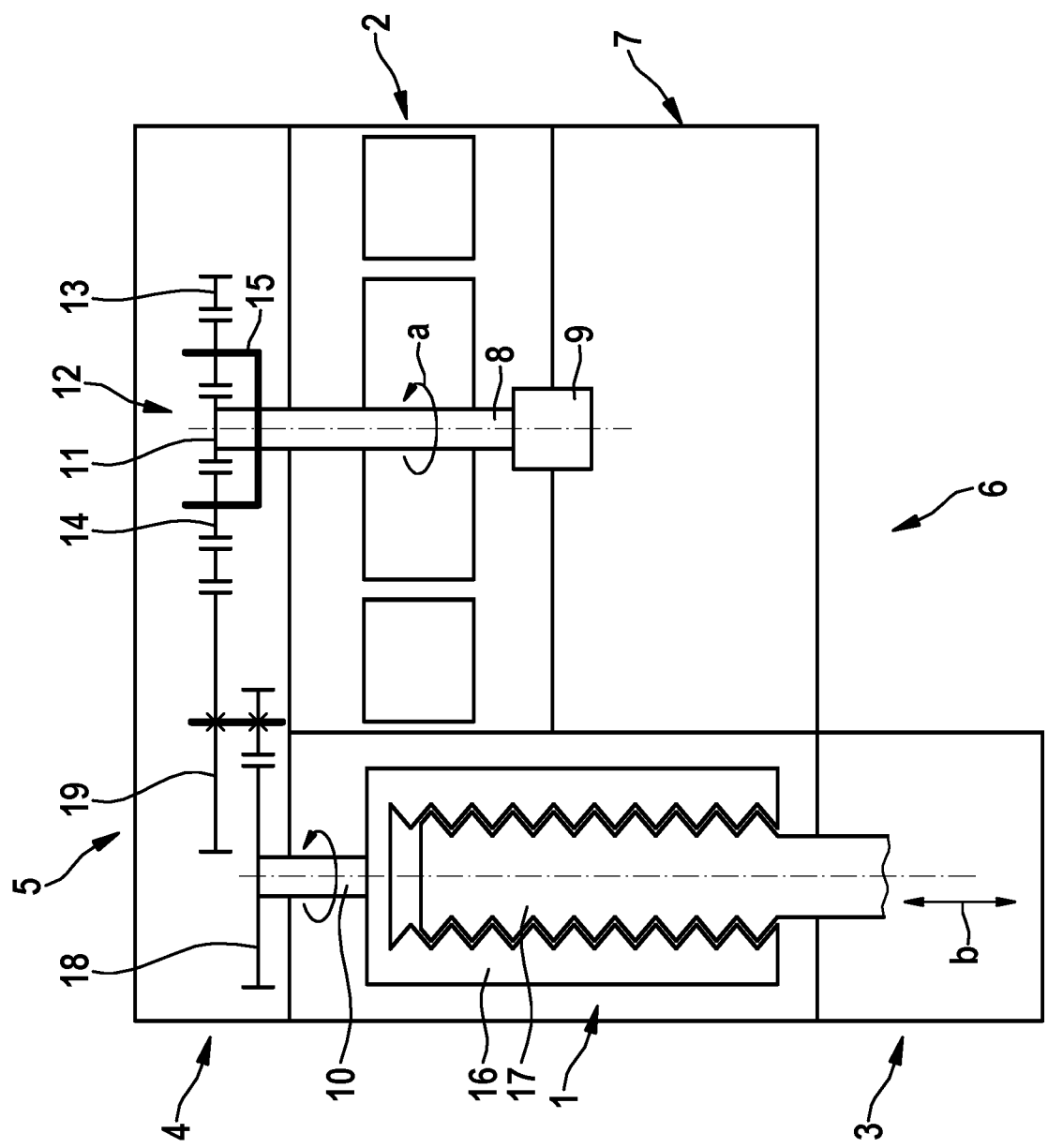
FIG. 1 is a schematic longitudinal section through an electromechanical braking force generator in accordance with an example embodiment of the present invention.

In accordance with FIG. 1, the electromechanical brake pressure generator for a hydraulic braking system (not depicted here in further detail) of a vehicle encompasses a spindle drive unit 1 by which a rotational motion a, generated on the input drive side by an electric drive motor 2, is converted into a translational motion b for piston actuation of a hydraulic piston/cylinder unit 3.

Located in the power flow between electric drive motor 2 and spindle drive unit 1 is a multi-stage gear linkage 4 that provides conversion of a rapid motor rotation speed of electric drive motor 2 down to a rotation speed that is slower in comparison, for driving spindle drive unit 1. Gear linkage 4 is disposed on a first end face 5, serving as a mechanical connection side, of drive motor 2 and spindle drive unit 1.

Second end face 6 located oppositely from first end face 5 serves, conversely, as an electrical connection side. Disposed on this second end face 6 is an electronic control unit 7 for applying control to electric drive motor 2 in accordance with a required braking force assistance, which is ascertained in a conventional manner. Also arranged in the region of that end of a motor shaft 8 which is located oppositely from gear linkage 4, in conjunction with electronic control unit 7, is a sensor 9 that directly detects the motor rotation speed of electric drive motor 2 and conveys it a short distance to electronic control unit 7 for regulation purposes.

In the electromechanical brake pressure generator, motor shaft 8 of electric drive motor 2 extends in adjacently parallel fashion next to a spindle drive shaft 10 of spindle drive unit 1. A planetary gearset unit 12, which is driven by a motor pinion 11 constituting a sun gear and is disposed coaxially with respect to electric drive motor 2, and whose output-drive-side ring gear 13 drives spindle drive unit 1, is provided in order to transfer drive power in the context of gear linkage 4. Several planet gears 14 (by way of example) of planet gearset unit 12 are mounted rotatably on a common planet carrier 15 that is attached in stationary fashion to the electromechanical brake pressure generator.

In this exemplifying embodiment, spindle drive unit 1 encompasses an externally located spindle nut 16 and a spindle 17 that is in direct threaded engagement therewith. Spindle nut 16 is drivable via a spindle gear 18, fastened coaxially thereon, of gear linkage 4, so that the rotational motion of spindle nut 16 produces, in a conventional manner, a translational motion of spindle 17 for actuation of hydraulic brake cylinder unit 3.

Figure 2:
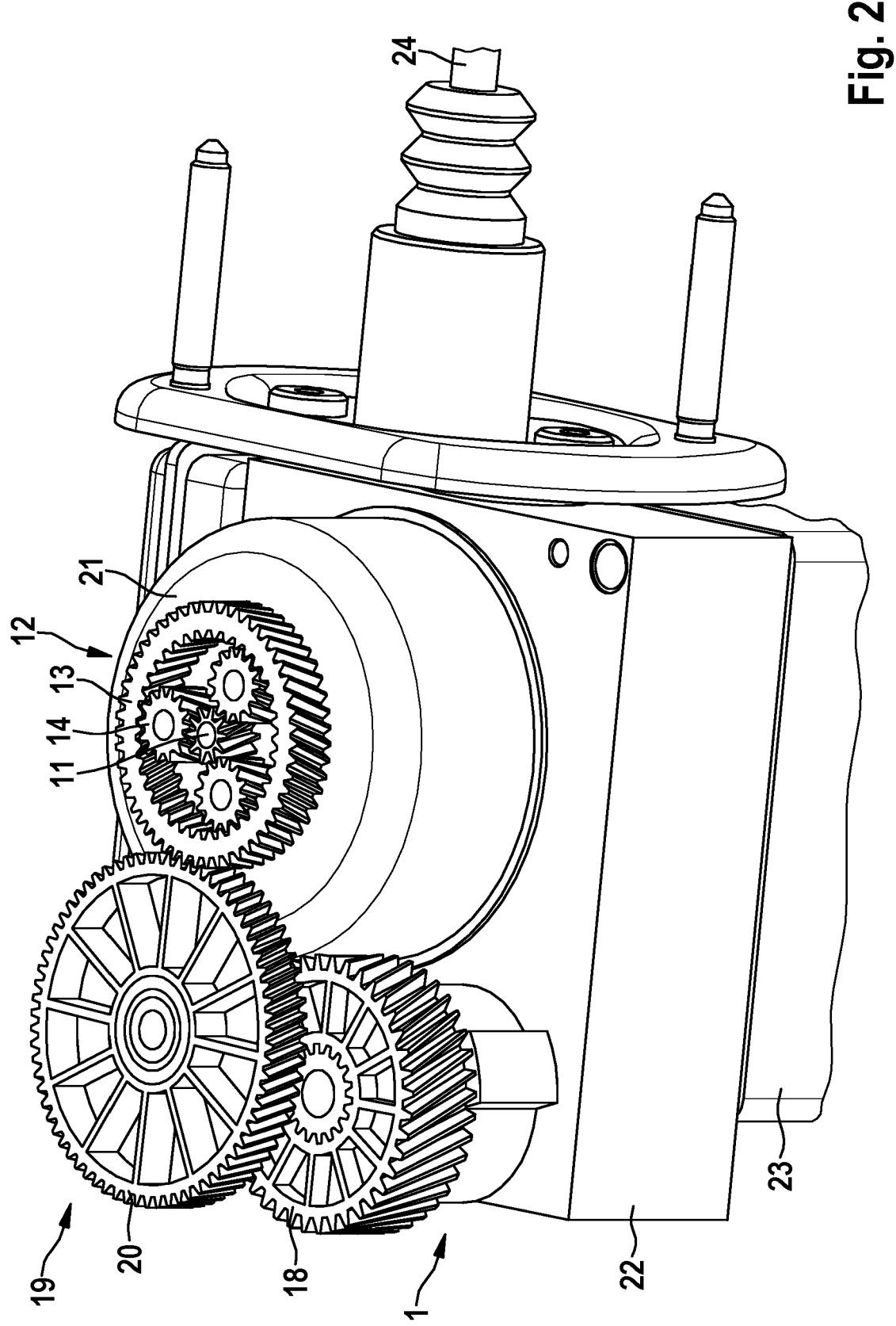
FIG. 2 is a perspective view of the brake pressure generator of FIG. 1 in a design embodiment, with a cover part opened.

FIG. 2 illustrates in detail, with cover part 20 opened (and therefore not depicted here), the interaction of the components of gear linkage 4.

The components of gear linkage 4 include an intermediate stepped gear 19 whose larger gear 20 meshes with the externally toothed ring gear 13 of planetary gearset 12. A pinion (concealed here by large gear 20) of intermediate stepped gear 19 meshes on the output drive side with spindle gear 18 of spindle drive unit 1.

The electric drive motor (not visible in this perspective exterior view) is accommodated within a cup-shaped motor housing 21 whose bottom region also carries planetary gearset unit 12. The cup-shaped motor housing comes into abutment against a device housing 22 that is of cuboidal basic geometry. Located on the opposite side surface is a further housing part 23 for accommodation of electronic control unit 7 (not further evident here). Projecting into the substantially cuboidal device housing 22, which in this exemplifying embodiment is made of a lightweight alloy, is an input rod 24 for attachment of a brake pedal (not depicted in further detail here) that serves in conventional fashion to transfer a manual braking input.

The present invention is not limited to the preferred exemplifying embodiment described above. Variations thereof are instead also possible. For example, it is also possible to impart a different geometric conformation to the individual housing parts and components, provided the disposition concept, which contains a parallel adjacent disposition of the motor shaft and spindle drive shaft which are coupled to one another according to the present invention via the special gear linkage, is retained.

What is claimed is:

1. An electromechanical brake pressure generator for a hydraulic braking system of a vehicle, comprising:
    a spindle drive unit configured to convert an input-drive-side rotational motion into a translational motion for piston actuation of a hydraulic piston/cylinder unit;
    a multi-stage gear linkage disposed between the spindle drive unit and an electric drive motor, the gear linkage encompassing a planetary gearset unit driven by a motor pinion constituting a sun gear, an output-drive-side ring gear of the planetary gearset unit configured to drive the spindle drive unit; and
    a motor shaft of the electric drive motor which extends in adjacently parallel fashion next to a spindle drive shaft of the spindle drive unit;
    wherein the output-drive-side ring gear is an externally toothed ring gear.

2. The electromechanical brake pressure generator as recited in claim 1, wherein the gear linkage is disposed on a first end face of the drive motor and spindle drive unit.

3. The electromechanical brake pressure generator as recited in claim 2, wherein an electronic control unit has electrical terminals for a sensor configured to detect a motor rotation speed in a region of the motor shaft and for the drive motor, the electronic control unit being disposed on a second end face, located oppositely from the first end face, of the drive motor and spindle drive unit.

4. The electromechanical brake pressure generator as recited in claim 1, wherein the gear linkage has an intermediate stepped gear whose larger gear meshes with the externally toothed ring gear of the planetary gearset unit, and a pinion of the intermediate stepped gear meshes with a spindle gear of the spindle drive unit.

5. The electromechanical brake pressure generator as recited in claim 4, wherein the spindle drive unit encompasses a spindle nut and a spindle in threaded engagement with the spindle nut, the spindle nut or the spindle being drivable via the spindle gear, fastened coaxially to it, of the gear linkage so that a rotational motion of the spindle nut or of the spindle produces, under an influence of a torque brace, a translational motion respectively of the spindle or of the spindle nut.

6. The electromechanical brake pressure generator as recited in claim 1, wherein the electric drive motor is accommodated in a cup-shaped motor housing.

7. The electromechanical brake pressure generator as recited in claim 6, wherein the ring gear of the planetary gearset unit is mounted in rolling bearings on a bottom region of the cup-shaped motor housing.

8. The electromechanical brake pressure generator as recited in claim 6, wherein planet gears of the planetary gearset unit are disposed on a planet carrier attached to a bottom region of the cup-shaped motor housing.

9. The electromechanical brake pressure generator as recited in claim 6, wherein the cup-shaped motor housing comes into abutment with an edge region against a device housing that is of cuboidal basic geometry.

10. A vehicle, comprising:
    an electromagnetic brake pressure generator for a hydraulic braking system, the electromagnetic brake pressure generator including:
        a spindle drive unit configured to convert an input-drive-side rotational motion into a translational motion for piston actuation of a hydraulic piston/cylinder unit;
        a multi-stage gear linkage disposed between the spindle drive unit and an electric drive motor, the gear linkage encompassing a planetary gearset unit driven by a motor pinion constituting a sun gear, an output-drive-side ring gear of the planetary gearset unit configured to drive the spindle drive unit; and
        a motor shaft of the electric drive motor extending in adjacently parallel fashion next to a spindle drive shaft of the spindle drive unit;
        wherein the output-drive-side ring gear is an externally toothed ring gear.

\* \* \* \* \*